United States Patent
Li et al.

(10) Patent No.: US 7,496,596 B2
(45) Date of Patent: Feb. 24, 2009

(54) DETECTING MIGRATION DIFFERENCES OF A CUSTOMIZED DATABASE SCHEMA

(75) Inventors: Peng Li, Beijing (CN); Ke Fei Wang, Beijing (CN); Bing Jiang Sun, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 300 days.

(21) Appl. No.: 11/475,287

(22) Filed: Jun. 26, 2006

(65) Prior Publication Data

US 2006/0294120 A1    Dec. 28, 2006

(30) Foreign Application Priority Data

Jun. 27, 2005    (CN) .................... 2005 1 0081019

(51) Int. Cl.
*G06F 7/00*    (2006.01)
(52) U.S. Cl. ....................... 707/102; 707/203
(58) Field of Classification Search ......... 707/100–102, 707/200–203
See application file for complete search history.

(56) References Cited

U.S. PATENT DOCUMENTS

| 6,772,180 | B1 | 8/2004 | Li et al. | |
|---|---|---|---|---|
| 6,792,605 | B1 | 9/2004 | Roberts et al. | |
| 7,281,018 | B1 * | 10/2007 | Begun et al. | 707/102 |
| 7,379,978 | B2 * | 5/2008 | Anderson et al. | 709/219 |
| 2004/0153469 | A1 | 8/2004 | Keith-Hill | |
| 2004/0153968 | A1 | 8/2004 | Ching et al. | |
| 2004/0194016 | A1 | 9/2004 | Liggitt | |
| 2004/0268230 | A1 * | 12/2004 | Liu et al. | 715/511 |
| 2005/0204347 | A1 * | 9/2005 | Jurkiewicz et al. | 717/137 |
| 2007/0220065 | A1 * | 9/2007 | Coyle et al. | 707/203 |

OTHER PUBLICATIONS

Bychkov, Y. and J.H. Jahnke, "Interactive Migration of Legacy Databases to Net-Centric Technologies", *Proceedings of the Eighth Working Conference on Reverse Engineering*, Oct. 2001, pp. 328-334.
Fernandes, H. and G. Hu, "Migration of Relational Databases", *Proceedings of the ISCA Seventeenth International Conference on Computers and their Applications*, Apr. 2002, pp. 188-191.

(Continued)

*Primary Examiner*—Wilson Lee
(74) *Attorney, Agent, or Firm*—Konrad Raynes & Victor LLP; Janaki K. Davda (57) ABSTRACT

Provided is a database schema migration difference detecting technique for detecting differences of a customized database schema before and after database migration by using XML technology, including: extracting a first database schema from a fresh database of a release and saving the first database schema in a first XML file; extracting a customized database schema from a customized database of the release and saving the customized database schema in a second XML file; comparing the first and second XML files, filtering the identical content in the first and second XML files and saving differences in a delta XML file; and comparing the delta XML file with a new database to detect a state of the customized database schema after migration. The detecting state indicates whether there is any loss or change in the customized database schema after migration, as well as, conflicts with the database schema in a database of a new release.

6 Claims, 6 Drawing Sheets

OTHER PUBLICATIONS

IBM Corporation, "A Process for Migration of Database Application to Enterprise Java Environment", *IBM Research Disclosure*, No. 448117, Aug. 2001, pp. 1390-1391.

Lau, T.C., J. Lu, E. Hedges, and E. Xing, "Migrating E-Commerce Database Applications to an Enterprise Java Environment", *Proceedings of the 2001 Conference of the Centre for Advanced Studies on Collaborative Research*, Nov. 2001, 11 pgs.

Lee, T., M. Chams, R. Nado, S. Madnick, and M. Siegel, "Information Integration with Attribution Support for Corporate Profiles", *Proceedings of the ACM Conference on Information and Knowledge Management*, Nov. 1999, pp. 423-429.

Stonebraker, M. and J.M. Hellerstein, "Content Integration for E-Business", *Proceedings of the ACM SIGMOD International Conference on Management of Data*, May 2001, pp. 552-560.

\* cited by examiner

DETECTING MIGRATION DIFFERENCES OF A CUSTOMIZED DATABASE SCHEMA

CROSS-REFERENCE TO RELATED FOREIGN APPLICATION

This application claims priority benefits under Title 35, United States Code, Section 119(a)-(d) or Section 365(b) of Chinese Patent Application No. 200510081019.4, filed on Jun. 27, 2005, by Peng Li, et al., and entitled "Method and System for Detecting Migration Difference of Customized database Schema", which application is incorporated herein by reference in its entirety.

TECHNICAL FIELD

The present invention relates to a technique for detecting schema differences before and after a database (DB) migration, and, more particularly, to a technique for detecting schema differences before and after the migration of a customized DB based on Extensible Markup Language (XML) technology.

BACKGROUND ART

Most software provides customers with a migration mechanism that is used to enable customers to use new features and to get benefits from high performance that the software provides in a higher release. One of the most important parts of migration is database migration, which may be split into two parts: DB schema migration and data migration. DB schema migration includes the migration of tables, views, columns, indexes, primary keys, foreign keys, triggers, etc. In the course of the test of IBM® WebSphere® Commerce migration performed by the inventors, customers often provided feedback that DB migration failure happened on a customized DB schema. The problems are at least one of the following:

Problem 1. Something was lost in the customized database schema after the DB migration. For example, assume that customers defined a column C on a table T (T is not the customized table). During the migration to the higher release of the product, the table T was dropped or recreated. Meanwhile, the column C was lost.

Problem 2. The customized database schema conflicted with the new release's schema. For example, assume that customers defined a table T in a previous release. The new release also has a table named T. In this case, the difference of the table definitions between the customized one and one in the new release are ignored during migration.

In the present, there is no efficient method to detect conflicts before migration and verify the customized schema migration.

SUMMARY OF THE INVENTION

The present invention aims to provide a DB schema migration difference detecting method and system capable of detecting whether a customized DB schema conflicts with a DB schema in a database of a new release and verifying whether there will be any loss or change in the migration of the customized DB schema.

In order to achieve the above objective, the present invention provides a database schema migration difference detecting method for detecting differences of a customized database schema before and after database migration by using XML technology, the method including: extracting a first database schema from a fresh database of a release and saving the first database schema in a first XML file; extracting a customized database schema from a customized database of the release and saving the customized database schema in a second XML file; comparing the first and second XML files, filtering identical content in the first and second XML files, and saving differences in a delta XML file; and comparing the delta XML file with a new database to detect a state of the customized database schema after migration.

The present invention also provides a database schema migration difference detecting system for detecting the difference of a customized database schema before and after database migration by using XML technology, the system comprising: a first database schema extracting module for extracting a first database schema from a fresh database of a release and saving the first database schema in a first XML file and for extracting a customized database schema from the customized database of the release and saving the customized database schema in a second XML file; a first XML comparison module for comparing the first and second XML files, filtering identical content in the first and second XML files, and saving differences in a delta XML file; and a comparison detecting module for comparing the delta XML file with a new database to detect a state of the customized database schema after migration.

The present invention provides the following advantages:

1) Embodiments of the present invention do not require that a customer provide a customized schema presented using XML, which can be done automatically by the present invention.

2) By adopting an XML technique, it is easy and flexible to get the customized DB schema and compare the customized DB schema with the migrated DB schema.

3) DB schema conflicts can be detected and located automatically and accurately.

For internal customers, such as migration testers, the present invention will help them verify whether an original schema can be migrated to the schema of a new release correctly by migration tools. For external customers, the present invention will allow real customers to get benefits from a DB schema conflict alarm before migration.

BEST MODES FOR CARRYING OUT THE INVENTION

The idea of the present invention came from analyzing the comparison result between XML data and a database, thereby proposing a solution based on both the comparison between XML files and the comparison between XML data and the database.

Based on this point, the solution proposed by the present invention is substantially as follows. First, DB schemas are extracted from a fresh database in a certain release and a customized database in the same release, and then saved into a first and a second XML file, respectively; second, a delta schema is obtained by comparing the two XML files generated at the preceding step, with the delta schema containing the information on the customized DB schema and being also an XML file; and, finally, by comparing the XML file of the delta schema with a third XML file containing the DB schema in a database of a new release, DB schema conflicts can be discovered before DB migration, and by comparing the XML file of the delta schema with the migrated database, it can be known whether a customized DB schema will lose something after database migration. That is to say, the solution proposed by the present invention can detect the state of a customized DB schema after DB migration: whether the customized DB schema after migration conflicts with a DB schema of a new release database (in other words, it can be known before migration whether a customized DB schema will conflict with a DB schema of a new release database), and whether there is any loss or change in the customized DB schema after DB migration. The database of the new release or customized DB schema after migration can be regarded as a new database. The present invention realizes the above detecting by comparing a delta XML file and a new database.

Hereinafter an embodiment of the present invention will be described in detail with reference to the drawings.

Figure 1:
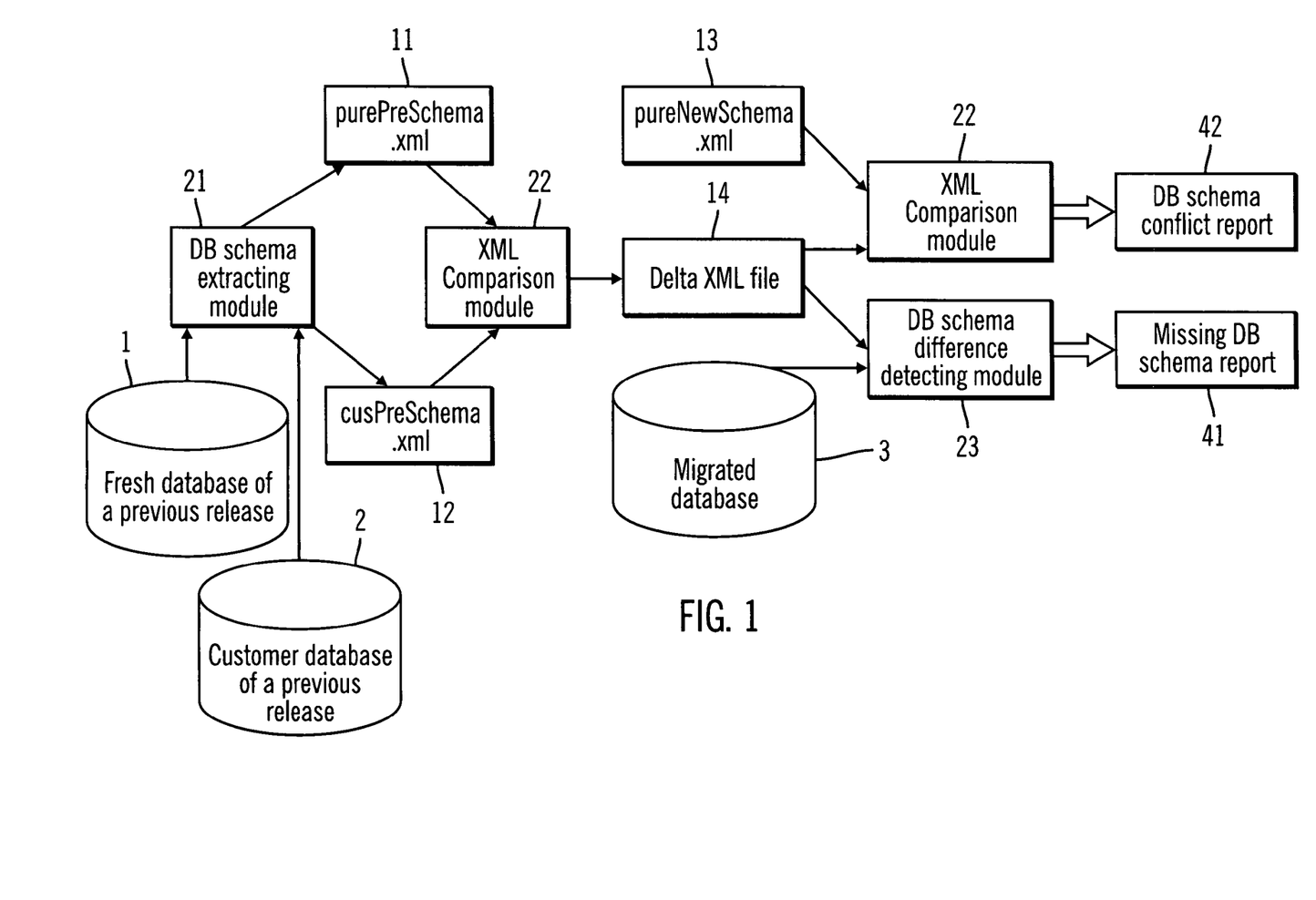
FIG. 1 shows a schematic diagram of a system according to an embodiment of the present invention, for illustrating a structure and a general workflow of the present invention.

Referring to FIG. 1, the system of the present invention comprises a DB schema extracting module (for example, ExtractSchema command) 21, an XML comparison module (for example, XMLComparison command) 22 and a DB schema difference detecting module (for example, CheckSchema command) 23.

The DB schema extracting module (for example, ExtractSchema command) 21 extracts a DB schema from a fresh database 1 of a previous release and saves the extracted DB schema into an XML file (a first XML file such as purePreSchema.xml) 11. Running the ExtractSchema command 21 can extract a DB schema from a customer database 2 of a previous database 2 and save the extracted DB schema into an XML file (a second XML file such as cusPreSchema.xml) 12.

The XML comparison module (for example, XMLComparison command) 22 compares the above two XML files 11 and 12 (for example, purePreSchema.xml and cusPreSchema.xml), and filters the identical content in the two XML files, then saves the differences in a delta XML file (for example, cusDeltaPreSchema.xml) 14, where the delta XML file 14 represents a customized DB schema and contains the DB schema information existing in the cusPreSchema.xml file 12 but not existing in purePreSchema.xml file 11, whereby a customized DB schema in XML format can be obtained.

The DB schema difference detecting module (for example, CheckSchema command) 23 compares the delta XML file 14 and the migrated database 3. CheckSchema command 23 reads out DB schema information from the delta XML file 14, and then identifies (detects) whether a customized DB schema will lose something or a change (for example, a field in the DB schema is changed) is made on any customized DB schema after migration.

Figure 7:
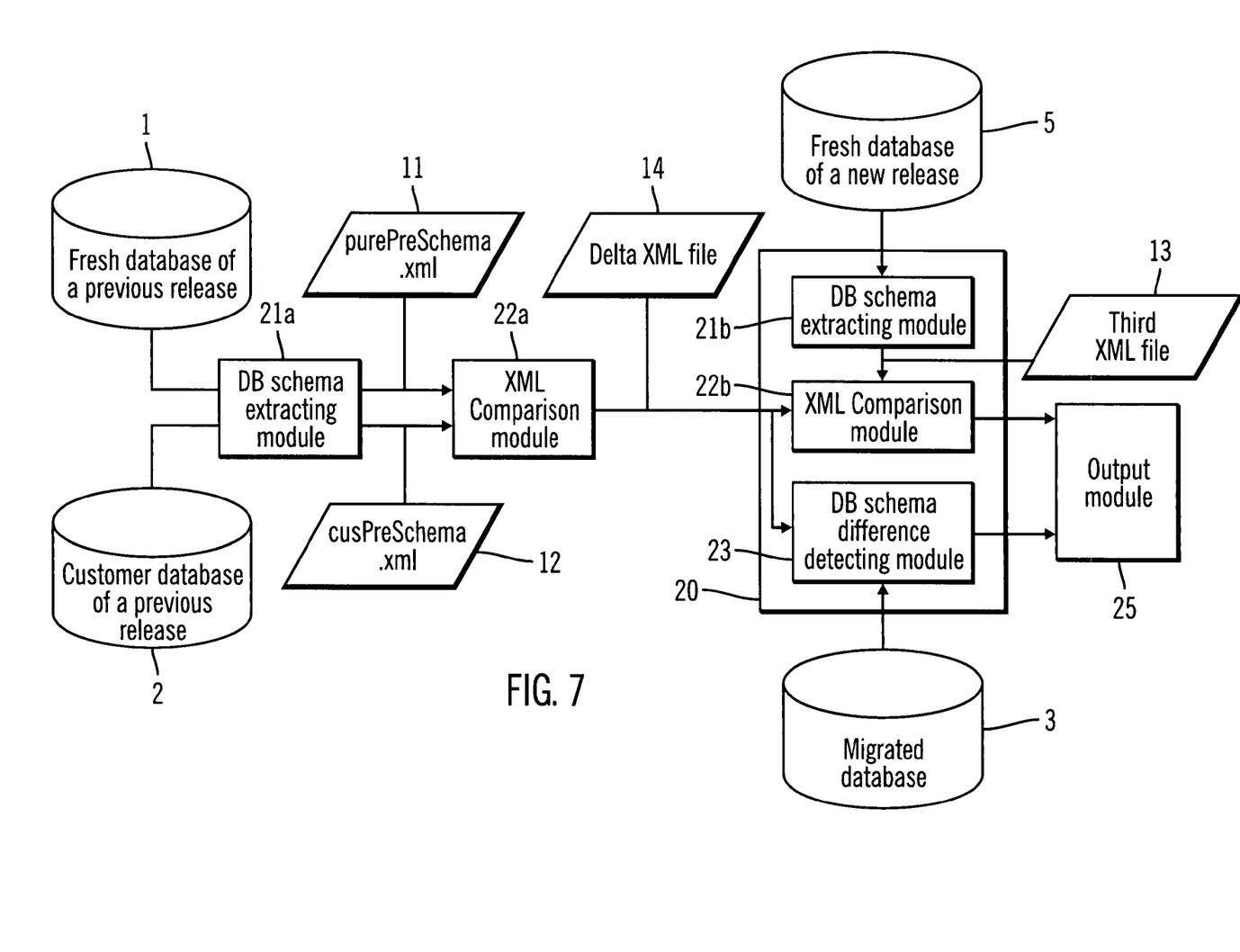
FIG. 7 illustrates a block diagram of a system according to an embodiment of the present invention.

FIG. 7 illustrates a block diagram of a system according to an embodiment of the present invention. The reference sign identical with that in FIG. 1 indicates the same component, and its detailed description will be omitted below. The comparison detecting module 20 in FIG. 7 contains a second DB schema extracting module 21B, a second XML comparison module 22B and a DB schema difference detecting module 23.

The first DB schema extracting module 21A extracts DB schemas from the fresh database 1 of the previous release and the customer database 2 to generate a first XML file and a second XML file; then the first XML comparison module 22A compares the first XML file and the second XML file to obtain a delta XML file.

The comparison detecting module 20 can be used for comparing the delta XML file and the fresh database 5 of a new release. Specifically, the second DB schema extracting module 21B in the comparison detecting module 20 extracts a DB schema from the fresh database 5 of the new release and generates a third XML file containing the DB schema information of the new release database. Then the second XML comparison module 22B in the comparison detecting module 20 compares the delta XML file and the third XML file, thereby detecting whether there is any DB schema conflict in the migration of the customized database.

The comparison detecting module 20 can also be used for comparing the delta XML file and a customized database 3. Specifically, the comparison is made by the DB schema difference detecting module 23 in the comparison detecting module 20, which can detect whether a customized DB schema will lose something or a change is made on any customized DB schema after migration of the customized database.

The output module 25 in FIG. 7 is used for presenting to users the detected result of the comparison detecting module 20 (whether the migration of the customized database has any DB schema conflict or whether a customized DB schema will lose something or a change is made on any customized DB schema after migration of the customized database), the prompt example of which will be described below.

While the first DB schema extracting module 21A and the second DB schema extracting module 21B as well as the first XML comparison module 22A and the second XML comparison module 22B are displayed separately in FIG. 7, they can be implemented respectively as a same module.

The system according to the present invention can be constructed in a database, for example, integrated in a general-purpose DBMS, or act as an extensible module for detecting the state of the DB migration before migration.

Hereinafter a DB schema migration difference detecting method of the present invention will be described with reference to FIG. 1.

The method of the present invention first extracts a DB schema from a fresh database 1 of a previous release, and saves the extracted DB schema in the first XML file 11; then extracts a DB schema from the customized database 2 of the previous release and saves the extracted DB schema in the second XML file 12; compares the above two XML files, and filters the identical content in the two XML files and then saves the differences in the delta XML file 14. As mentioned above, this process can produce a customized DB schema in XML format. Next, the following Steps 1 and 3 or Step 2 can be performed so as to solve the two problems mentioned in the Background Art. Problem 1 can be solved by performing Step 2, which is useful for internal users to verify the DB schema migration. Problem 2 can be solved by performing Steps 1 and 3, and external users can get benefits therefrom.

Step 1: run the DB schema extracting module (for example, ExtractSchema command) 21 to extract from the fresh database 5 of a new release (not shown) a DB schema of the fresh database of the new release, and save the extracted DB schema in the XML file (for example, pureNewSchema.xml) 13.

Step 2: run the DB schema difference detecting module (for example, CheckSchema command) 23 to compare the delta XML file 14 with the migrated database, which can detect whether a customized DB schema loses something or a change is made on any customized DB schema after migration.

Step 3: run the XML comparison module (for example, XMLComparison command) 22 to compare such two XML files (14 and 13) as cusDeltaPreSchema.xml and pureNewSchema.xml, which can detect before migration whether the migration of the customized database causes any conflicts with any DB schema.

After completing steps 1 and 3 or step 2, the detected result can be presented to users.

Hereinafter, the implementation of the modules in FIG. 1 will be described.

Figure 2:
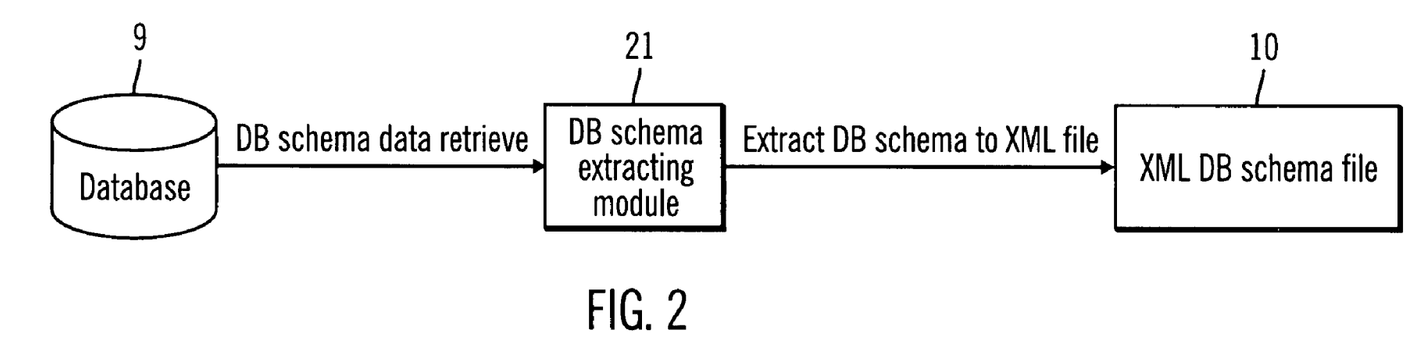
FIG. 2 illustrates an implementation of DB schema extracting module 21 in FIG. 1.

Referring to FIG. 2, the implementation of the DB schema extracting module 21 in FIG. 1 will be described. The DB schema extracting module 21 retrieves DB schema data from database 9, extracts the DB schema data, and saves the extracted DB schema data in the DB schema XML file 10, thereby forming a DB schema in XML format. Herein, the database 9 can represent the fresh database 1 and customized database 2 in FIG. 1, and the DB schema XML file 10 can represent the XML files 11, 12 and 13.

A Java®-based technology using JDBC/XML can be used to extract and store DB schema information retrieved from different database management systems (DBMSs).

First, a set of SQL statements against a certain DBMS retrieve necessary DB schema information from a System Category of the DBMS. For example, a query is used to retrieve all the tables' information of one specific DB schema owner from the database. A corresponding set of SQL statements are used according to different DBMS. For DB2®, the following can be used:

SELECT TABNAME FROM SYSCAT.TABLES WHERE TABSCHEMA = '$SCHEMAOWNER'.

For an Oracle® database, the following can be used:

SELECT TNAME,TABTYPE FROM SYS.TAB

For DB2® 390, the following can be used:

SELECT NAME FROM SYSIBM.SYSTABLES WHERE CREATOR='$SCHEMAOWNER'

Preferably, the corresponding SQL statements supporting these three database types are stored separately in respective property files, and embodiments are easy to extend so as to support other different database types.

Then, the DB schema information is stored in a format of XML. As an example, the following XML node can be constructed to store table information. This XML is convenient for comparison and contains enough detailed information to describe the schema object.

```
<schema>
    <tables>
        <table TABNAME="EG_VIEWREG"/>
    </tables>
</schema>
```

Next, a Java® program will connect to a specific database using a JDBC driver according to the different input parameters. SQL statements defined in the previous property files are read into String and run on the specific database locally or remotely. The result set is obtained from the DBMS, and each record is filtered and stored into the XML file using the proper format defined in the previous step. The same procedure is run for the other schema objects, including Columns, Indices, Primary Key, Foreign Key, and Store Procedures. At this point, the needed DB schema is extracted and stored in XML format.

The key to implement DB schema extracting module 21 is to construct SQL statements against different databases and satisfy the requirement of DB schema comparison precision. A DB schema presented in XML format is also an important part of software architecture.

Extracting a DB schema is the base of DB schema verification. As mentioned above, three tasks can be done by DB schema extracting module 21: extracting a DB schema from the fresh database 1 of a previous release; extracting a customized DB schema (changed by a user) from customized database 2 of the previous release; and extracting an updated new DB schema from the fresh database of the new release.

Figure 3:
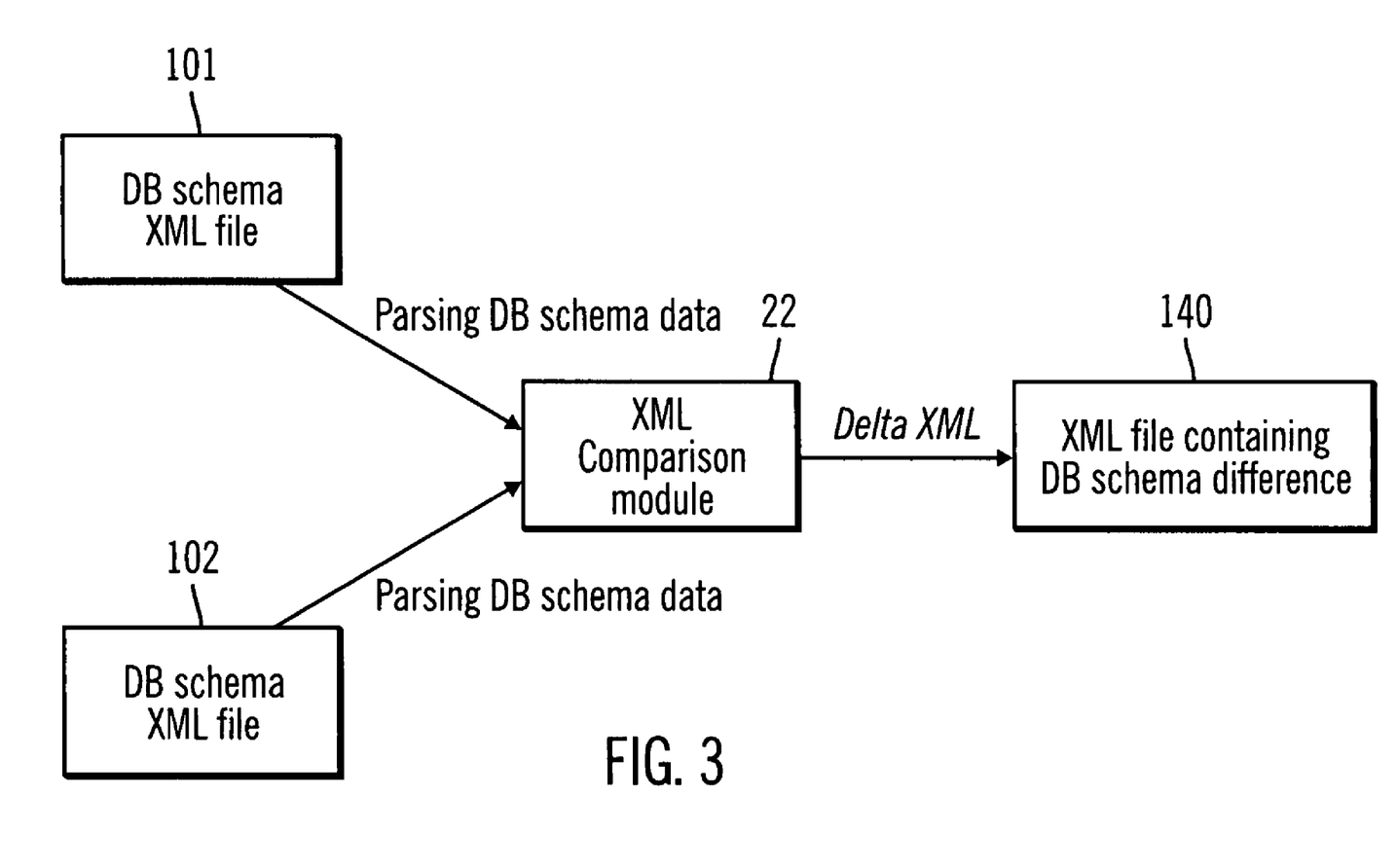
FIG. 3 illustrates an implementation of XML comparison module 22 in FIG. 1.

FIG. 3 illustrates an implementation of XML comparison module 22 in FIG. 1. XML comparison module 22 parses DB schema data from two arbitrary DB schema XML files 101 and 102 respectively, compares them, filters the identical content in the two XML files, and stores the differences (Delta XML) into XML file 140, which contains the DB schema differences between the two XML files 101 and 102. It is easy to understand that DB schema XML files 101 and 102 herein can represent XML files 11 and 12 in FIG. 1, and can also represent XML file 13 and delta XML file 14 in FIG. 1; and XML file 140 herein can represent delta XML file 14 in FIG. 1.

Figure 4:
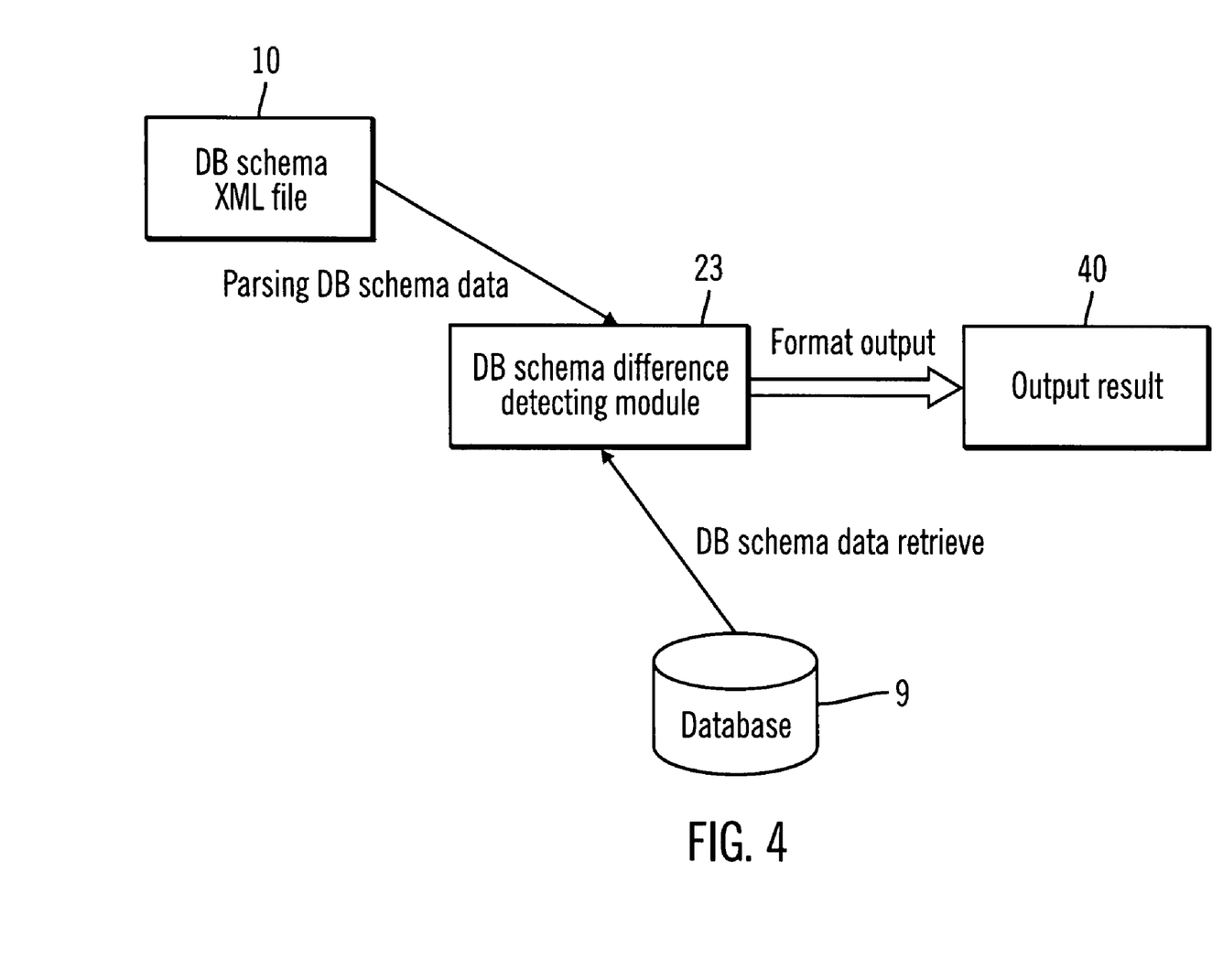
FIG. 4 illustrates an implementation of DB schema difference detecting module 23 in FIG. 1.

FIG. 4 illustrates an implementation of the DB schema difference detecting module 23 in FIG. 1. The DB schema difference detecting module 23 can make a comparison between an XML file and a database. As shown in FIG. 4, the DB schema difference detecting module 23 parses DB schema data from a DB schema XML file 10, and retrieves DB schema data from the database 9 to obtain the required DB schema data, then compares the retrieved DB schema data from the database 9 with the DB schema data from DB schema XML file 10, and finally formats the comparison result and outputs the comparison result to obtain an output result 40. Likewise, it is easy to understand that the DB schema XML file 10 herein can correspond to the delta XML file 14 in FIG. 1, the database 9 can correspond to the migrated database 3 in FIG. 1, and the output result 40 can correspond to the missing DB schema report 41 in FIG. 1.

It is easy to understand that the result output can be implemented independently of the DB schema difference detecting module 23. Therefore, the missing DB schema report 41 or the DB schema conflict report 42 can be the result of the independently implemented output module, such as the output module 25 in FIG. 7.

There are two ways to accomplish the DB schema comparison. The first way is to compare the two XML files by using a specific rule and dump the differences to the new XML file. The second way is to instantiate the elements in the XML file of the DB schema as logic Java® objects such as TableModel, ColumnModel, RowModel and so on, and then invoke the appropriate method of a Java® object to find the DB schema differences from a target database. The first comparison way and the second comparison way correspond to the XML comparison module 22 and the DB schema difference detecting module 23 respectively.

The first comparison way is carried out to compare XML files as follows:

1. Define the comparison rule, only dump that node existing in the XML file of the customized DB schema but not existing in the XML file of the fresh DB schema. The equal nodes have a same node name, identical attribute, and value.
2. Initialize the two XML files as a DOM tree.
3. Get each node by order in a first DOM tree and check if the node exists in a second DOM tree.
4. Store a different node in a new XML file by using a uniform format set when a DB schema is extracted.

The second comparison way is carried out to make a comparison between an XML file and a target database as follows:

1. Initialize the XML file of a DB schema as a DOM tree and then initialize each leaf node in the DOM tree as a Java object, for example:

```
<table TABNAME="EG_VIEWREG"/>
```

Figure 5:
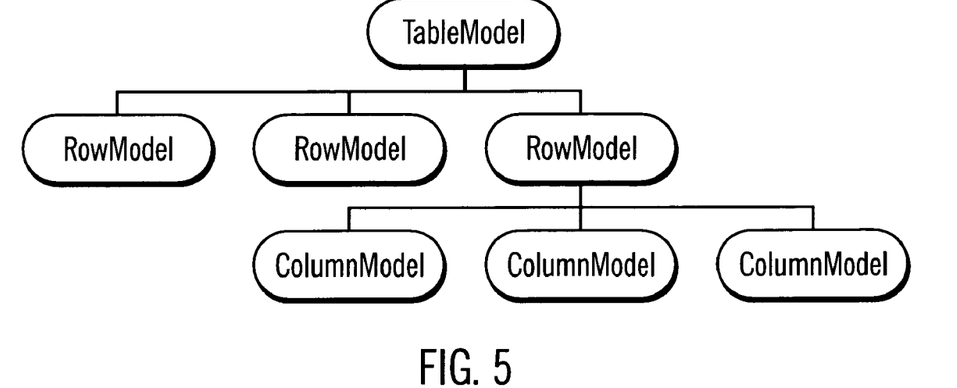
FIG. 5 illustrates a tree relation among TableModel, RowModel and ColumnModel.

2. Initialize a Java class of TableModel by using a system category table name {SYSCAT.TABLES} and specific schema owner name (db2admin). Initialize the property (TABNAME="EG_VIEWREG") of each leaf node as a ColumnModel and then create a RowModel object consisting of at least one ColumnModel. As shown in FIG. 5, a tree relation between TableModel, RowModel and ColumnModel is shown.

Figure 6:
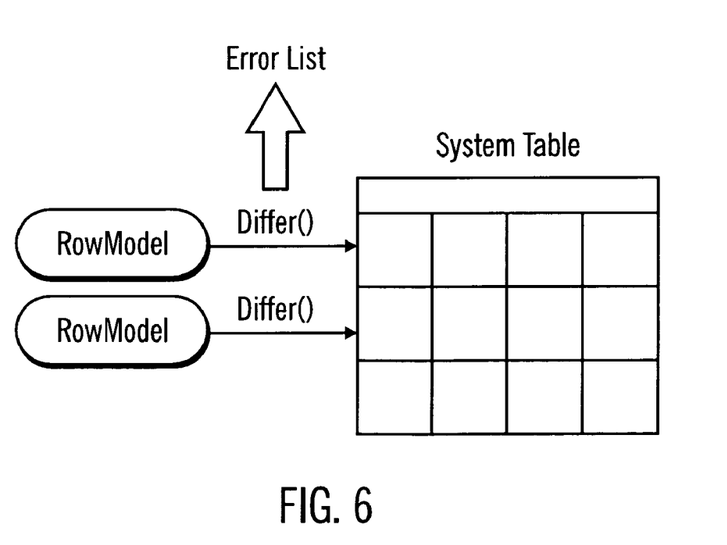
FIG. 6 illustrates that an error list is obtained by comparing a RowModel and a system table.

3. Referring to FIG. 6, invoke the method differ( ) of RowModel to get a row difference between RowModel and system table.

4. Run the similar procedure on all RowModel, and store all differences in an error list shown in FIG. 6.

5. Format the content in the error list, display a message of schema differences. and optionally write them down in an error log.

After performing the above steps of obtaining a customized DB schema in XML format, the XML file can be obtained as follows:

```
<?xml version="1.0" encoding="UTF-8"?>
<schema>
<tables>
<table TABNAME="EG_VIEWREG"/>
...
</tables>
<columns>
<column TABNAME="JUNK" COLNAME="COL1" TYPENAME="CHARACTER" LENGTH="5" NULLS="Y" SCALE="0"/>
...
<indices>
<index COLNAMES="+CATENTRY_ID_CHILD+CATRELTYPE_ID" TABNAME="CATENTREL" UNIQUERULE="D" COLCOUNT="2" INDEXTYPE="REG "/>
<index COLNAMES="+ADDRESS_ID" TABNAME="ST_ADDRESS" UNIQUERULE="P" COLCOUNT="1" INDEXTYPE="REG "/>
...
</indices>
<primarykeys>
<primarykey TABNAME="ST_CATENTRY_RESOURCE" TYPE="P"/>
<primarykey TABNAME="ST_ORDER_STATUS" TYPE="P"/>
...
</primarykeys>
<foreignkeys>
<foreignkey CONSTNAME="R_1499" TABNAME="ST_CATENTRY_RESOURCE" TYPE="F"/>
<foreignkey CONSTNAME="R_1498" TABNAME="ST_CATENTRY_RESOURCE" TYPE="F"/>
<foreignkey CONSTNAME="R_1490" TABNAME="ST_ORDER_STATUS" TYPE="F"/>
...
</foreignkeys>
<storedprocedures>
<storedprocedure PROCNAME="PROCEDURE1" PARM_COUNT="1" PROGRAM_TYPE="S"/>
...
</storedprocedures>
</schema>
```

In a solution to Problem 1, a missing DB schema prompt can be obtained as follows:

```
[SCHEMA]***************
fk does not exist in this database: userdb
CONSTNAME='R_1498' AND TABNAME='ST_CATENTRY_RESOURCE' AND
TYPE='F'
[SCHEMA]***************
fk does not exist in this database: userdb
CONSTNAME='R_1471' AND TABNAME='ST_ORDER_STATUS' AND TYPE='F'
```

In a solution to Problem 2, a DB schema conflict prompt can be got like this:

```
SCHEMA]***************
fk conflict
CONSTNAME='R_1498' AND TABNAME='ST_CATENTRY_RESOURCE' AND
TYPE='F'
[SCHEMA]***************
fk conflict
CONSTNAME='R_1471' AND TABNAME='ST_ORDER_STATUS' AND TYPE='F'
```

The present invention is not limited to the above embodiments. The various commands as mentioned in the drawings and the above description are only illustrative and can be changed or modified without departing from the spirit and scope of the present invention.

IBM, WebSphere, and DB2 are registered trademarks or common law marks of International Business Machines Corporation in the United States and/or other countries. Java is a registered trademark or common law mark of Sun Microsystems in the United States and/or other countries. Oracle is a registered trademark or common law mark of Oracle Corporation in the United States and/or other countries.

The invention claimed is:

1. A database schema migration difference detecting method for detecting differences of a customized database schema before and after database migration by using XML technology, the method comprising:
   before migrating schema and data from an old release of a software product to a new release of said software product;
   extracting a first database schema from a fresh database of the old release of said software product and saving the first database schema in a first XML file;
   extracting a customized database schema from a customized database of the release and saving the customized database schema in a second XML file;
   comparing the first and second XML files, filtering identical content in the first and second XML files, and saving differences in a delta XML file;
   comparing the delta XML file with a second database schema from a new database of the new release of said software product; and
   in response to the comparing, detecting whether the customized database schema from the customized database of the release of said software product after migration would conflict with the second database schema from the new database of the new release of said software product.

2. The method of claim 1, wherein the new database is a customized database after migration, and wherein comparing the delta XML file with the second database schema from the new database comprises: reading database schema information from the delta XML file; and
   comparing the read database schema information with database schema information retrieved from the customized database after migration, thereby detecting whether there is any loss or change in the customized database schema after migration.

3. The method of claim 1, wherein the new database is a fresh database of the new release of said software product and wherein comparing the delta XML file with the new database comprises:
   extracting the second database schema from the fresh database of the new release of said software product and saving the second database schema into a third XML file; and
   comparing the delta XML file with the third XML file to detect whether the customized database schema after migration conflicts with the second database schema in the fresh database of the new release of said software product.

4. The method of claim 1, further comprising: presenting the detected state to users.

5. A method for detecting differences of a customized database schema before and after database migration, comprising:
   before migrating schema and data from a first release of a software product to a second release of said software product;
   saving a first database schema from a first database of the first release of said software product in a first XML file;

saving a customized database schema from a customized database of the first release of said software product in a second XML file;

while comparing the first and second XML files, filtering identical content in the first and second XML files, and saving differences in a delta XML file;

saving a second database schema from a new database of the second release into a third XML file;

comparing the delta XML file with the third XML file; and in response to the comparing, detecting whether the customized database schema of the customized database of the first release of said software product conflicts with the second database schema of the new database of the second release of said software product.

6. The method of claim 5, wherein the new database is another customized database after migration and wherein comparing the delta XML file with the third XML file from the new database comprises:

reading database schema information from the delta XML file; and comparing the read database schema information with database schema information retrieved from the new database.

* * * * *